United States Patent [19]

Tezuka

[11] Patent Number: 4,661,868

[45] Date of Patent: Apr. 28, 1987

[54] CASSETTE LOADING MECHANISM WITH MALFUNCTION PREVENTING MEANS

[75] Inventor: Nobuo Tezuka, Kanagawa, Japan

[73] Assignee: Canon Kabushiki Kaisha

[21] Appl. No.: 493,302

[22] Filed: May 10, 1983

[30] Foreign Application Priority Data

May 19, 1982 [JP] Japan .................... 57-84405

[51] Int. Cl.⁴ .................. G11B 5/008; G11B 17/00
[52] U.S. Cl. ........................... 360/96.6; 360/86
[58] Field of Search .................. 360/97-99, 360/86, 133, 96.5-96.6; 369/270-271; 346/137

[56] References Cited

U.S. PATENT DOCUMENTS

| 3,394,898 | 7/1968 | Laa | 360/96.6 |
| 4,194,224 | 3/1980 | Grapes et al. | 360/97 |
| 4,337,487 | 7/1982 | Takai | 360/96.5 |
| 4,345,283 | 8/1982 | Maryschka | 360/96.6 |
| 4,467,379 | 8/1984 | Itani | 360/96.5 |

FOREIGN PATENT DOCUMENTS

| 0040467 | 11/1971 | Japan | 360/96.6 |
| 0019064 | 6/1972 | Japan | 360/96.6 |
| 0158005 | 9/1978 | Netherlands | 360/96.6 |
| 0575692 | 10/1977 | U.S.S.R. | 360/96.6 |

Primary Examiner—Stuart N. Hecker
Assistant Examiner—David J. Severin
Attorney, Agent, or Firm—Toren, McGeady and Goldberg

[57] ABSTRACT

A cassette handling apparatus having a main body part; a cassette receiving part arranged to be able to assume first and second states relative to the main body part; a moving member arranged to be in a first state when a portion of the cassette is loaded on the cassette receiving part and in a second state upon completion of cassette loading; and a device for preventing the cassette receiving part from shifting from the first to the second state thereof when the moving member is in the first state thereof and for allowing the cassette receiving part to shift from the first to the second state thereof when the moving member is in its second state, whereby the cassette can be reliably prevented without fail from being used in an incompletely loaded condition on the cassette receiving part.

5 Claims, 8 Drawing Figures

F I G. 1
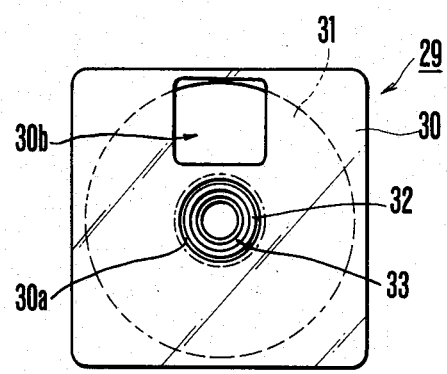
F I G. 2
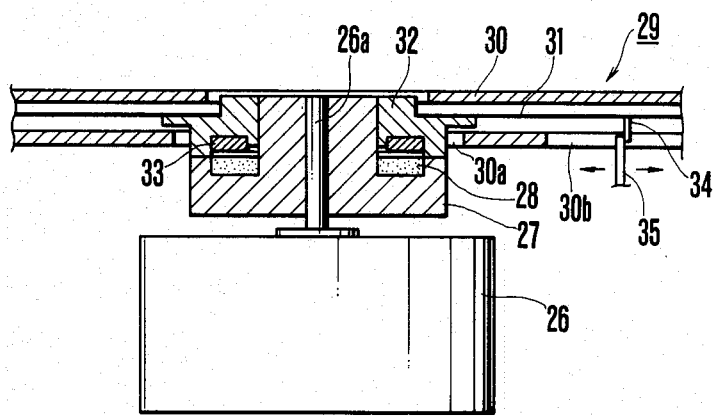

CASSETTE LOADING MECHANISM WITH MALFUNCTION PREVENTING MEANS

BACKGROUND OF THE INVENTION

1. Field of the Invention

This invention relates to a cassette handling apparatus.

2. Description of the Prior Art

Heretofore there have been proposed various recording and/or reproducing devices arranged to perform recording and/or reproducing by loading thereon cassettes containing recording media such as magnetic sheets or magnetic tapes. The apparatus of this kind is convenient for handling the recording medium since it is protected by the cassette. However, there may arise the danger of damaging a recording head or a drive shaft due to erroneous or incomplete loading of the cassette. Further, in the case of a cassette containing a magnetic sheet or the like, the cassette is sometimes thinly fabricated. Such a cassette tends to have the cassette itself or the magnetic sheet therein damaged or broken due to erroneous or incomplete loading.

With regard to an arrangement for taking the cassette out of the apparatus on the other hand, there has been proposed an arrangement in which the cassette is arranged to be pushed out from a cassette receiving part of the apparatus in response to a cassette removing operation. This arrangement has considerably improved the operability of the apparatus. However, as a result of a tendency to reduce the size of such apparatus, it has become preferable to have no directional limitation for handling the apparatus. In other words, it has become preferable to have the apparatus arranged to be easily and safely operable in any direction. However, in the case of the apparatus of the prior art arranged to push out a cassette from a cassette receiving part in response to a cassette removing operation, the cassette has been in danger of being broken or damaged by being dropped when the removing operation is performed with the cassette port facing in a downward direction.

SUMMARY OF THE INVENTION

A general object of the present invention is to provide a novel cassette handling apparatus which is capable of eliminating the shortcomings of the prior art apparatus previously mentioned.

A more specific object of the invention is to provide a cassette handling apparatus in which a cassette receiving part is inhibited from closing on or coupling to the main body part of the apparatus when a cassette is partly loaded on the cassette receiving part and is allowed to close on or couple to the main body part upon completion of cassette loading, whereby various portions of the main body part of the apparatus, the cassette and a recording medium contained in the cassette can be effectively prevented from being damaged by erroneous or incomplete cassette loading.

To attain this object, a preferred embodiment of the invention comprises a main body part; a cassette receiving part which is capable of assuming first and second states relative to the main body part; a moving member which is arranged to be in a first state when a cassette is partly loaded on the cassette receiving part and to be in a second state when the cassette is completely loaded; and means for inhibiting the shaft of the cassette receiving part from the first state to the second state thereof when the moving member is in its first state and for allowing the above-stated shift of the state of the cassette receiving part when the moving member is in its second state.

A further object of the invention is to provide a cassette handling apparatus having improved operability in which, in taking a cassette out of a cassette receiving part, a portion of the cassette is caused to protrude to the outside of the cassette receiving part so that the cassette can be easily taken out by holding it in the protruded state and also can be prevented from falling even in cases where the cassette is taken out in the downward direction.

To attain the above-stated object, a preferred example of a cassette handling apparatus according to the invention is provided with an operating part for taking out the cassette from the cassette receiving part; projecting means for enabling a portion of the cassette to protrude to the outside of the cassette receiving part in response to the operation of the operating part; and holding means for keeping the protruded portion of the cassette in the protruding state from the cassette receiving part.

These and further objects and features of the invention will become apparent from the following detailed description of embodiments thereof taken in connection with the accompanying drawings.

BRIEF DESCRIPTION OF THE DRAWINGS

FIG. 1 is a plan view showing a magnetic sheet cassette to be used in an embodiment of the present invention.

FIG. 2 is a schematic illustration of essential parts showing the coupled states of the magnetic sheet contained within the cassette of FIG. 1 and a magnetic sheet driving part of a cassette handling apparatus.

DETAILED DESCRIPTION OF THE PREFERRED EMBODIMENTS

Figure 3:
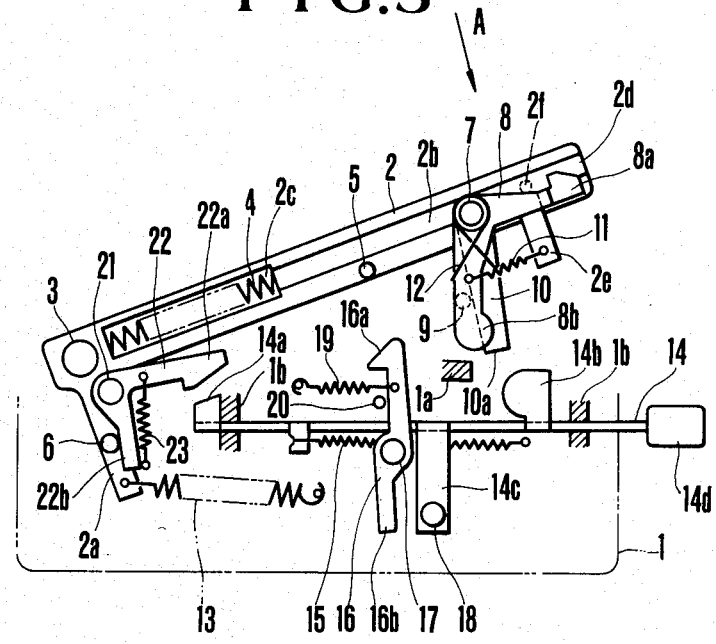
FIG. 3 is a side view showing the essential parts of an embodiment of a cassette handling apparatus according to the invention in a state having a cassette receiving part thereof opened.

Referring to FIG. 1 reference numeral 29 indicates a magnetic sheet containing cassette in its entirety. The cassette 29 consists of a cassette housing 30 having a magnetic sheet or disc 31 contained within the housing 30 as a recording medium. A sheet core 32 is fixedly provided in the middle part of the sheet 31 and a sheet chucking ring 33 is secured to the core 32. The cassette housing 30 is provided with an opening 30a which is arranged in the middle part of at least one side thereof to expose a portion of the sheet core 32 and is also provided with another opening 30b which is arranged to permit a recording head to have access to the magnetic sheet 31.

Referring now to FIG. 2, the apparatus is provided with a sheet rotating motor 26 having a rotation shaft 26a. A hub 27 is secured to the rotation shaft 26a and is provided for mounting thereon the sheet 31. A sheet chucking permanent magnet 28 is secured to a portion of the sheet mounting hub 27 and is axially magnetized. The sheet core 32 is made of a non-magnetic material such as a plastic material and is provided with a central opening for fitting engagement with the hub 27. On the outside of this opening there is disposed a sheet chucking ring 33. The sheet chucking ring 33 is made of a magnetic material. The sheet core 32 is arranged to be magnetically secured to the hub 27 by virtue of the attraction of the ring 33 by the magnet 28. Under this condition, the sheet core 32 rotates together with the motor rotation shaft 26a and thus causes the sheet 31 to rotate within the cassette housing. A recording/reproducing magnetic head 34 is carried by a head carrier 35. With the apparatus loaded with the cassette 29, the head 34 is either in contact with a recording surface of the sheet 31 or closely confronting the recording surface leaving a slight gap between them through the opening 30b of the housing 30. Under this condition, a signal is recorded on or reproduced from the sheet 31 along a spiral track or cocentric tracks. In that instance, the position of the head 34 relative to the sheet 31 is shifted as the carrier 35 is moved in the direction of the arrows as shown in the drawing by a suitable means which is not shown.

Figure 5:
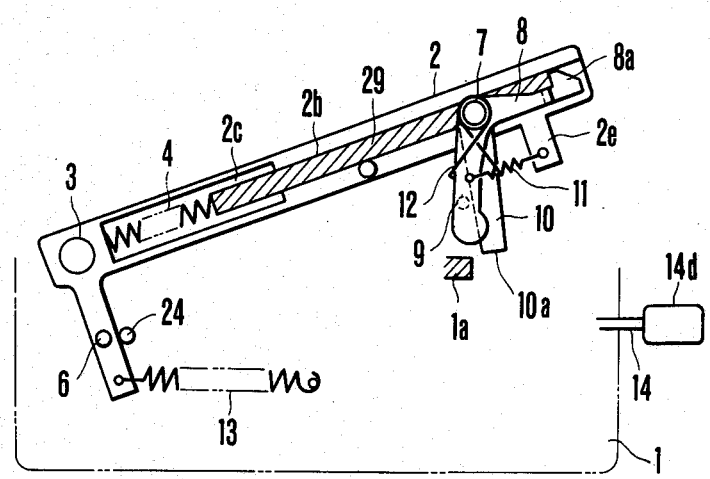

Next, referring to FIG. 3, there is shown main body part 1 of a cassette handling apparatus having the motor 26 and the head 34 which are as shown in FIG. 2 and which are arranged in suitable positions respectively. The apparatus is also provided with a cassette receiving part 2 and a shaft 3 which connects the cassette receiving part 2 with the main body part 1. A spring 13 is arranged between an arm portion 2a of the cassette receiving part 2 and the main body part 1. This spring 13 exerts a force to urge the cassette receiving part 2 to turn counterclockwise on the shaft 3. This turning movement of the cassette receiving part 2 is restricted by a pin 24 (FIG. 5). The cassette receiving part 2 is provided with a vacant space 2b for accommodating a cassette 29 therein, a space 2c for accommodating a spring 4 and a cassette loading port 2d. The space 2c is larger than the other space 2b in its vertical dimension and the movable extent of the spring 4 is limited to the inside of the space 2c. A shaft 7 is provided on a portion of the cassette receiving part 2 and is arranged to pivotally carry a cassette lock lever 8 and a stop lever 10. These levers 8 and 10 are urged by the force of a spring 12 to operate as a unified arrangement. However, since a pin 9 is provided on the lever 8 as shown in the drawing, these levers 8 and 10 normally turn together with some opening angle being maintained therebetween. Between the cassette lock lever 8 and a protrudent portion 2e extending downward from the cassette receiving part 2, there is provided a spring 11 which exerts a turning force on the cassette lock lever 8 and the stop lever 10 to urge them to turn counterclockwise on the shaft 7. However, these levers 8 and 10 are kept in the state shown in FIG. 3 with the cassette locking part 8a of the lever 8 abutting on a portion of the cassette receiving part 2. For this purpose, a pin 2f is provided on one side portion of the cassette receiving part 2 as shown in FIG. 3 and is arranged to restrict the turning movement of the lever 8. An end part 8b of the lever 8 is arranged to abut on a cam part 14b of an eject lever 14 at the time of a cassette removing operation which will be described later herein.

A lock pin 5 provided on a side portion of the cassette receiving part 2 is arranged to engage with a hook part 16a of a receiving part locking lever 16 when the cassette receiving part 2 is closed on the main body part 1 as will be described later herein. Attached to the arm portion 2a of the cassette receiving part 2 is a driven pin 6 which is arranged to push one end 22b of a lock member 22 for locking the eject lever 14 when the cassette receiving part 2 is opened from the main body part 1 as shown in FIG. 3. With one end 22b pushed by the drive pin 6, the lock member 22 is set into a state having been turned counterclockwise on a shaft 21. The lock member 22 is urged to move clockwise by a spring 23. However, this uring force of the spring 23 is weaker than the urging force of the spring 13 which is exerted on the lock member 22 through the drive pin 6. The receiving part locking lever 16 is urged to move counterclockwise on a shaft 17 by the force of a spring 19 but is normally kept by a pin 20 at the position as shown in FIG. 3.

Figure 6:
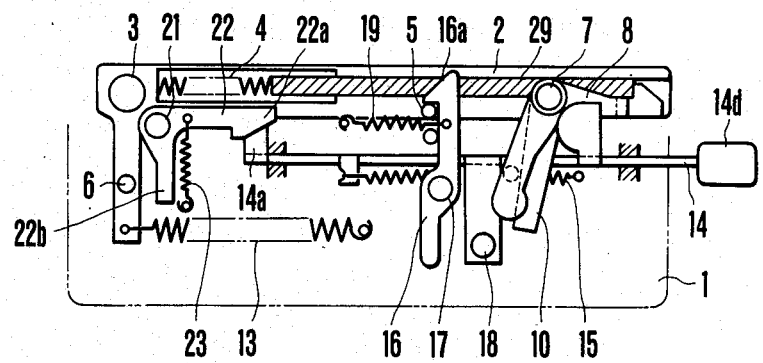
Figure 7:
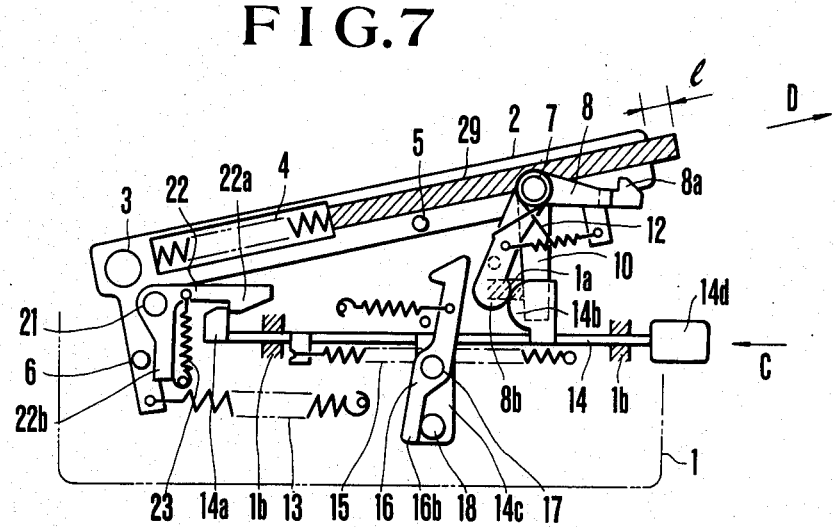
FIG. 7 is a sectional illustration showing the apparatus of FIG. 3 in a state where the cassette receiving part is turned halfway up during a process of taking the cassette out.

The eject lever 14 is arranged to be slidably guided by a portion 1b of the main body part 1 and is urged to move to the right by a spring 15. The eject lever 14 is provided with a lock part 14a which is arranged to engage with the hook part 22a of the lock member 22 as shown in FIG. 6. The cam part 14b of the eject lever 14 is arranged to abut on one end 8b of the cassette lock lever 8 during a cassette removing operation as shown in FIGS. 6 and 7. The eject lever 14 is further provided with a protrudent part 14c which has a pin 18 attached thereto. This pin 18 is arranged to push one end 16b of the receiving part locking lever 16 during a cassette removing operation as shown in FIG. 7. Further, there is provided an operation knob 14d for operation of the eject lever 14.

In the structural arrangement which has been described above, when an external force is applied to the cassette receiving part 2 in the direction of arrow A as shown in FIG. 3 to turn it clockwise on the shaft 3 with the cassette 29 not loaded on the cassette receiving part 2, the receiving part 2 is closed on the main body part 1 as shown in FIG. 6. Then, the lock pin 5 engages the hook part 16a of the locking lever 16 to keep the cassette receiving part 2 in the closed state. A stop part 1a of the main body part 1 is so positioned as to be outside the moving locus of the stop lever 10 during the turning movement of the cassette receiving part 2 when the stop lever 10 is rotated counterclockwise by the cassette lock lever 8. Further, one end 8b of the cassette lock lever 8 never comes to abut on the cam part 14b of the eject lever 14 during the turning movement of the cassette receiving part 2.

Figure 4:
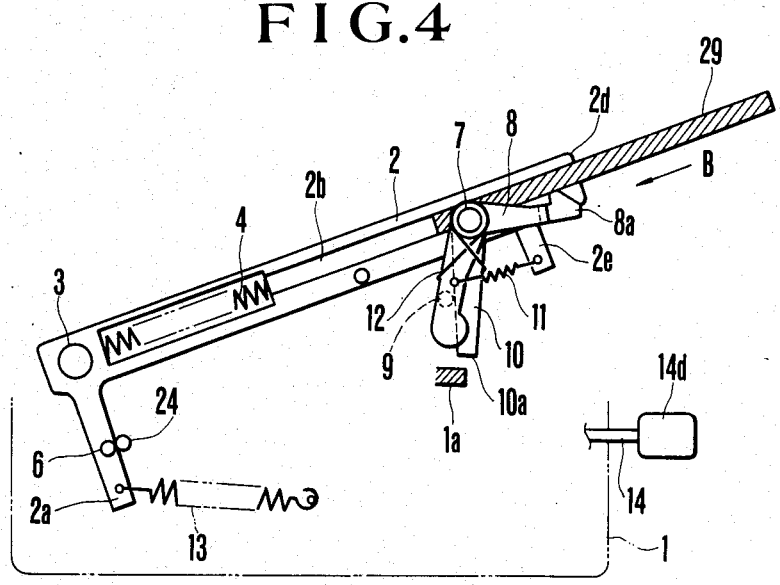
FIGS. 4, 5 and 6 are sectional illustrations showing the apparatus of FIG. 3 at different stages of being loaded with the cassette, FIG. 4 showing a stage of having a portion of the cassette loaded thereon, FIG. 5 showing a stage of having the cassette completely loaded and FIG. 6 showing a stage of having the cassette receiving part closed after completion of cassette loading.

Next, when the cassette 29 is partially inserted into the cassette loading port 2d of the cassette receiving part 2 in the direction of arrow B as shown in FIG. 4, the lock part 8a of the cassette lock lever 8 is pushed by the lower surface of the cassette 29 to turn clockwise against the urging force of the spring 11. Then, the stop lever 10 also turns clockwise together with the lock lever 8. In this instance, the moving locus of the stop lever 10 differs from that of FIG. 3. Therefore, the cassette receiving part 2 cannot be turned clockwise under this condition because the fore end 10a of the stop lever 10 then comes to abut on the stop part 1a of the main body part 1 to inhibit the cassette receiving part 2 from turning. In other words, the cassette receiving part cannot be closed on the main body part 1 before completion of loading the cassette receiving part 2 with the cassette 29. Further, the same inhibiting condition is obtained in the case of inadequate or wrong loading of the cassette 29 since in such a case the lock part 8a is likewise in the above-stated clockwise turning position.

FIG. 5 shows the cassette 29 as in a completely loaded state after it has been further pushed into the cassette receiving space 2b of the cassette receiving part 2. Upon completion of loading the cassette receiving part 2 with the cassette 29 in this manner, the urging force of the spring 11 causes the cassette lock lever 8 to turn counterclockwise back to the original position thereof, where it abuts on the pin 2f as shown in FIG. 3. The stop lever 10 then turns counterclockwise together with the lock lever 8 and thus comes out of contact with the stop part 1a of the main body part 1 in the same manner as in the case of FIG. 3. Accordingly, the cassette receiving part 2 can be closed on the main body part 1 by turning it clockwise under this condition. After completion of loading of the cassette 29, the rear end of the cassette 29 enters the spring containing space 2c of the cassette receiving part 2 as shown in FIG. 5 and the spring 4 is charged. Under this condition, the fore end of the cassette 29 is locked by the lock part 8a of the cassette lock lever 8 and the cassette 29 is thus kept in the state shown in FIG. 5.

When the cassette receiving part 2 is closed on the main body part 1 as shown in FIG. 6, the engaging pin 5 provided on the cassette receiving part 2 engages with the lock part 16a of the locking lever 16 to keep the cassette receiving part in the state shown in FIG. 6. Under this condition, the core 32 of the magnetic sheet 31 contained within the cassette 29 engages with the hub 27 attached to the rotation shaft 26a of the motor 26 as shown in FIG. 2. Meanwhile, the magnetic head 34 comes into contact with or closely confronts the sheet 31 through the opening 30b of the cassette housing 30. Therefore, recording of a signal or reproduction of a recorded signal can be accomplished with the magnetic head 34 under this condition. Further, under the condition as shown in FIG. 6, the lock member 22 is released from the pushing pressure of the drive pin 6 on one end 22b thereof. The lock member 22 therefore turns clockwise due to the force of the spring 23 and the hook part 22a of the lock member 22 abuts the lock part 14a of the eject lever 14.

When removing the cassette 29, the knob 14d is operated to push the eject lever 14 in the direction of arrow C as shown in FIG. 7. With the eject lever 14 thus pushed, the pin 18 on the protrudent part 14c of the eject lever 14 pushes one end 16b of the receiving part locking lever 16. This causes the lever 16 to turn clockwise on the shaft 17. The lock part 16a of the lever 16 then disengages the lock pin 5 to allow the cassette receiving part 2 to be turned counterclockwise by the force of the spring 13. During the turning movement of the cassette receiving part 2, one end 8b of the cassette lock lever 8 comes to abut upon the cam part 14b of the eject lever 14. Therefore, the cassette lock lever 8 turns clockwise on the shaft 7 to disengage its lock part 8a from the cassette 29. At this instant, the stop lever 10 tries also to turn clockwise but the turning movement thereof is restricted by the stop part 1a of the main body part 1. As a result of that, the stop lever 10 moves upward while it is kept in contact with the stop part 1a of the main body part 1. Further, when the eject lever 14 is pushed in the direction of arrow C to a predetermined extent, the returning movement of the eject lever 14 to its original position by the force of the spring 15 is temporarily hindered as the hook part 22a of the lock member 22 engages with the lock part 14a of the lever 14.

Figure 8:
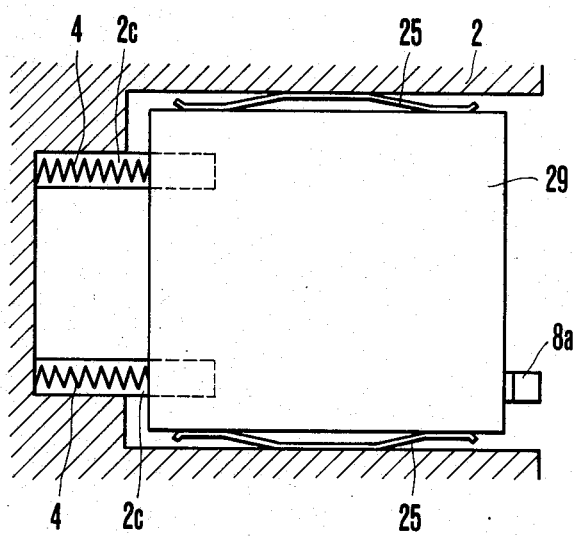
FIG. 8 is a plan view of the cassette receiving part.

Since the cassette 29 is released from the locking action of the cassette locking lever 8 as mentioned above, the spring 4 pushes the cassette 29 in the direction of arrow D as shown in FIG. 7. Then, since the urging force of the spring 4 is arranged to be exerted only within the spring containing space 2c as mentioned in the foregoing, the cassette 29 is brought into a position having its fore end protruding just to an extent l out of the cassette receiving part 2. In this specific embodiment, there is additionally provided brake means for keeping the cassette 29 in this state. Referring to FIG. 8, friction springs 25 are arranged to provide friction against the movement of the cassette 19 in the left and right directions as viewed on the drawing. Assuming that the magnitude of this friction is Ff, the pushing force of the spring 4 on the cassette 29 is Fd and the weight of the cassette is W, the cassette 29 is first pushed out from the spring containing space 2c to have a fore end portion thereof kept in the state shown in FIG. 7 wherein there exists the relationship $W < Ff < Fd$. Under this condition, the cassette never falls due to the force of gravity even if the direction of arrow D is in the downward direction. Further, the protruding length l of the cassette 29 may be more stably maintained by arranging th springs 25 to serve as click springs with U-shaped grooves or the like provided in the side walls of the cassette.

With the cassette receiving part 2 further turned, the arm portion 2a thereof comes to abut upon the pin 24. Then, as shown in FIG. 3, the drive pin 6 pushes one end 22b of the lock member 22. With the member 22 thus pushed, the eject lever 14 is released from the locking action of the hook part 22a of the lock member 22 on the lock part 14a thereof. The urging force of the spring 15 then brings the eject lever 14 back to its original position. In the cassette removing operation described above, the projecting movement of the cassette 29 causes no adverse effect on the recording head 34 and the drive hub 27 as it occurs only after the cassette receiving part 2 has turned to a certain extent.

The cassette removing mechanism may be arranged independently of the cassette loading mechanism previously mentioned. However, combination of the two ensures more reliable operation with a single mechanism.

As has been described above in the preferred form of the invention, the cassette receiving part is inhibited from coupling with the main body part when the cassette is only partly loaded or either erroneously or incompletely loaded on the cassette receiving part, and this coupling is allowed only after completion of cassette loading. Therefore, the recording head, the drive means and other members disposed within the main body part of the recording/reproducing apparatus and the cassette body or the recording medium contained in the cassette can be effectively protected from being damaged due to erroneous or incomplete loading of the cassette.

Further, in the above-described preferred embodiment, while the cassette is arranged to partly protrude to the outside of the cassette receiving part when removing it from the cassette receiving part to permit grasping thereof for easier handling, adoption of the arrangement as shown in FIG. 8 precludes the possibility that the cassette may be dropped even in cases where the cassette is taken out in the downward direction. The invention therefore not only improves the operability of the cassette handling apparatus but also effectively prevents the cassette from being damaged by falling.

While a specific embodiment of the invention has been shown and described in detail to illustrate the application of the inventive principles, it will be understood that the invention may be embodied otherwise without departing from such principles.

What I claim:

1. A recording and/or reproducing apparatus using a recording medium contained in a cassette, comprising:
   (A) a main body part;
   (B) a cassette receiving part adapted to be loaded with said cassette, said receiving part being movable relative to said main body part between a first position where loading and unloading of the cassette relative to the receiving part is enabled and a second position where the cassette is operatively associated with the main body part;
   (C) ejecting means for generating an urging force to eject the cassette from said cassette receiving part;
   (D) latching means for latching the cassette relative to said cassette receiving part against the urging force of said ejecting means in a condition where the cassette is completely loaded on the receiving part against the ejecting means, said latching means being movable between a latched position and an unlatched position;
   (E) movable means arranged to follow said latching means so that the movable means occupies a first position when the latching means is at its latched position and a second position when the latching means is at its unlatched position; and
   (F) engageable means engageable with said movable means when the movable means is at its second position so as to prevent said cassette receiving part from being moved to its second position.

2. The apparatus according to claim 1, further comprising:
   release means for releasing the latching of said cassette effected by said latching means, said release means being operable to move the latching means from its latched to its unlatched positions.

3. The apparatus according to claim 2, further comprising:
   brake means for braking the ejection of the cassette effected by said ejecting means so that the cassette is partially ejected from the receiving part.

4. The apparatus according to claim 3, wherein said ejecting means includes at least one urging spring provided on said cassette receiving part and acting upon said cassette, and said brake means includes at least one friction spring provided on the receiving part and acting upon the cassette.

5. A cassette loading device comprising:
   (A) a cassette holder for receiving therein a cassette and movable to a predetermined position;
   (B) an ejecting spring for ejecting the cassette from said cassette holder;
   (C) a latching member for latching the cassette against said ejecting spring when the cassette is inserted to a predetermined location within said cassette holder against the ejecting spring, said latching member being arranged to occupy a predetermined state when the cassette is not inserted to said predetermined location within the holder and the latching member does not latch the cassette; and
   (D) a preventing mechanism for preventing said cassette holder from being moved to said predetermined position when said latching member occupies said predetermined state, wherein said preventing mechanism includes:
   a movable first member operatively connected with said latching member so as to occupy a first and a second position in correspondence to a latched and an unlatched state of the latching member, respectively; and
   a fixed second member provided at a position where the second member is engageable with said first member when the first member occupies said second position, to prevent said cassette holder from being moved to said predetermined position.

* * * * *